United States Patent
Shimizu

(10) Patent No.: US 8,329,087 B2
(45) Date of Patent: Dec. 11, 2012

(54) METHOD OF MANUFACTURING MAGNETIC SHEET

(75) Inventor: Yuichi Shimizu, Miyagi-Ken (JP)

(73) Assignee: Alps Electric Co., Ltd., Tokyo (JP)

( * ) Notice: Subject to any disclaimer, the term of this patent is extended or adjusted under 35 U.S.C. 154(b) by 546 days.

(21) Appl. No.: 12/542,228

(22) Filed: Aug. 17, 2009

(65) Prior Publication Data
US 2010/0047547 A1 Feb. 25, 2010

(30) Foreign Application Priority Data

Aug. 21, 2008 (JP) .................. 2008-212674

(51) Int. Cl.
*H05B 6/00* (2006.01)
*B29C 67/00* (2006.01)
(52) U.S. Cl. .................. 264/427; 264/429; 264/437
(58) Field of Classification Search .................. 264/427, 264/437
See application file for complete search history.

(56) References Cited

U.S. PATENT DOCUMENTS

| | | | | |
|---|---|---|---|---|
| 3,412,461 A | * | 11/1968 | Cochardt | 29/608 |
| 4,209,481 A | * | 6/1980 | Kashiro et al. | 264/437 |
| 4,292,261 A | * | 9/1981 | Kotani et al. | 264/437 |
| 4,778,635 A | * | 10/1988 | Hechtman et al. | 264/437 |
| 5,248,864 A | * | 9/1993 | Kodokian | 219/634 |
| 6,517,744 B1 | * | 2/2003 | Hara et al. | 252/506 |
| 6,685,870 B2 | * | 2/2004 | Ukechi et al. | 264/437 |
| 7,452,492 B2 | * | 11/2008 | Sautier et al. | 264/104 |
| 7,601,281 B2 | * | 10/2009 | Masaki et al. | 264/108 |
| 7,859,377 B2 | * | 12/2010 | Kawarai | 336/83 |
| 2008/0003457 A1 | | 1/2008 | Endo | |
| 2008/0044680 A1 | * | 2/2008 | Thibodeau et al. | 428/547 |
| 2009/0002117 A1 | * | 1/2009 | Kawarai | 336/233 |
| 2012/0001368 A1 | * | 1/2012 | Filippov et al. | 264/413 |

FOREIGN PATENT DOCUMENTS

| | | | |
|---|---|---|---|
| JP | 62244682 A | * | 10/1987 |
| JP | 2003-229694 | | 8/2003 |

* cited by examiner

*Primary Examiner* — Christina Johnson
*Assistant Examiner* — Benjamin Schiffman
(74) *Attorney, Agent, or Firm* — Brinks Hofer Gilson & Lione

(57) ABSTRACT

A method of manufacturing a magnetic sheet includes a slurry sheet forming step, a local magnetic field applying step, and a slurry curing step. In the slurry sheet forming step, slurry is formed by mixing flat soft magnetic metal powder in a binding material, and a slurry sheet is formed by shaping the slurry into a sheet. In the local magnetic field applying step, only the orientation of the flat soft magnetic metal powder, which exists in the partial area, of the entire flat soft magnetic metal powder mixed in the slurry sheet is unified in a predetermined direction by locally applying a magnetic field to a partial area of the expanded slurry sheet in a predetermined direction. In the slurry curing step, a magnetic sheet is formed by curing the slurry sheet after the local magnetic field applying step.

5 Claims, 3 Drawing Sheets

METHOD OF MANUFACTURING MAGNETIC SHEET

CROSS REFERENCE TO RELATED APPLICATION

The present invention contains subject matter related and claims priority to Japanese Patent Application No. 2008-212674 filed in the Japanese Patent Office on Aug. 21, 2008, the entire contents of which being incorporated herein by reference.

BACKGROUND

1. Technical Field

The present invention relates to a magnetic sheet, a method of manufacturing the magnetic sheet, and an apparatus for manufacturing the magnetic sheet, and more particularly, to a magnetic sheet that may be suitable as a noise suppressing sheet, a method of manufacturing the magnetic sheet, and an apparatus for manufacturing the magnetic sheet.

2. Related Art

In general, a magnetic sheet means a sheet where a magnetic material is mixed to the inside or on the surface of a soft or hard binding sheet, and has been employed to mainly suppress radiation noise in the field of a high-frequency apparatus.

An example of a magnetic sheet in the related art is manufactured by three main steps, that is, a slurry forming step, an orientation adjusting step, a slurry sheet curing step. In the slurry forming step that is an initial step, slurry is formed by mixing a flat magnetic material in a liquid binding material. Flat soft magnetic metal powder is mainly selected as the flat magnetic material. In this step, the orientation of the flat magnetic material is not unified in one direction. Then, in the orientation adjusting step that is an intermediate step, a slurry sheet is formed by rolling the entire area of the slurry. Since the magnetic material has a flat shape, the magnetic material is transferred so as to release the pressure applied to the magnetic material mixed in the rolled slurry sheet and the in-plane direction (a direction orthogonal to the normal line of the plane) becomes parallel to the rolling direction. As a result, the orientation of the magnetic material is unified over the entire area of the slurry sheet. Further, in the slurry curing step that is a final step, the slurry sheet of which the orientation of the magnetic material is unified is cured. It may be possible to obtain a desired magnetic sheet through the above-mentioned steps (see U.S. Patent Application No. 2008003457).

In the orientation adjusting step, the orientation of the magnetic material may be unified by applying a magnetic field to the entire area of the slurry sheet in the in-plane direction of the slurry sheet after the slurry is shaped into a sheet (see Japanese Unexamined Patent Application Publication No. 2003-229694).

However, if the orientation of the magnetic material is adjusted by shaping the slurry into a sheet or applying a magnetic field to the entire area of the slurry sheet in the orientation adjusting step, the orientation of the magnetic material is unified over the entire area of the magnetic sheet. For this reason, there have been problems in that it is difficult to partially change the orientation of the magnetic material at a partial area of the magnetic sheet and the characteristics of the magnetic sheet cannot be locally changed.

For example, as described above, a magnetic sheet (a magnetic sheet where the magnetic materials are arranged laterally) where the in-plane direction of the magnetic sheet is parallel to the in-plane direction of the magnetic material has high magnetic permeability, and a magnetic sheet (a magnetic sheet where the magnetic materials are arranged longitudinally) where the normal direction of the magnetic sheet is orthogonal to the normal direction of the magnetic material has a high dielectric constant. Accordingly, the magnetic sheet where the orientation of the magnetic material is unified over the entire area of the magnetic sheet cannot but have only one characteristic of high magnetic permeability and a high dielectric constant.

In general, in order to cope with the above-mentioned problems, a double-layer magnetic sheet of which the orientation of the magnetic materials of respective layers is different has been manufactured by bonding a plurality of magnetic sheets. However, there is a concern that the double-layer magnetic sheet causes problems, such as a lack of strength of the bonded surface, a difficulty in aligning the bonding positions, and an increase in the thickness of the magnetic sheet.

SUMMARY

According to a first aspect of the disclosure, there is provided a method of manufacturing a magnetic sheet. The method includes a slurry sheet forming step, a local magnetic field applying step, and a slurry curing step. In the slurry sheet forming step, slurry is formed by mixing flat soft magnetic metal powder in a binding material, and a slurry sheet is formed by shaping the slurry into a sheet. In the local magnetic field applying step, only the orientation of the flat soft magnetic metal powder, which exists in the partial area, of the entire flat soft magnetic metal powder mixed in the slurry sheet is unified in a predetermined direction by locally applying a magnetic field to a partial area of the expanded slurry sheet in a predetermined direction. In the slurry curing step, a magnetic sheet is formed by curing the slurry sheet after the local magnetic field applying step.

According to the apparatus for manufacturing the magnetic, the orientation of the flat soft magnetic metal powder at the partial area of the magnetic sheet is orthogonal to that at the other area (entire area) thereof. Therefore, it may be possible to manufacture a magnetic sheet that has two opposite magnetic characteristics, specifically, a magnetic sheet to which high dielectric characteristics opposite to excellent noise suppressing characteristics are locally imparted.

DESCRIPTION OF EXEMPLARY EMBODIMENTS

Figure 1:
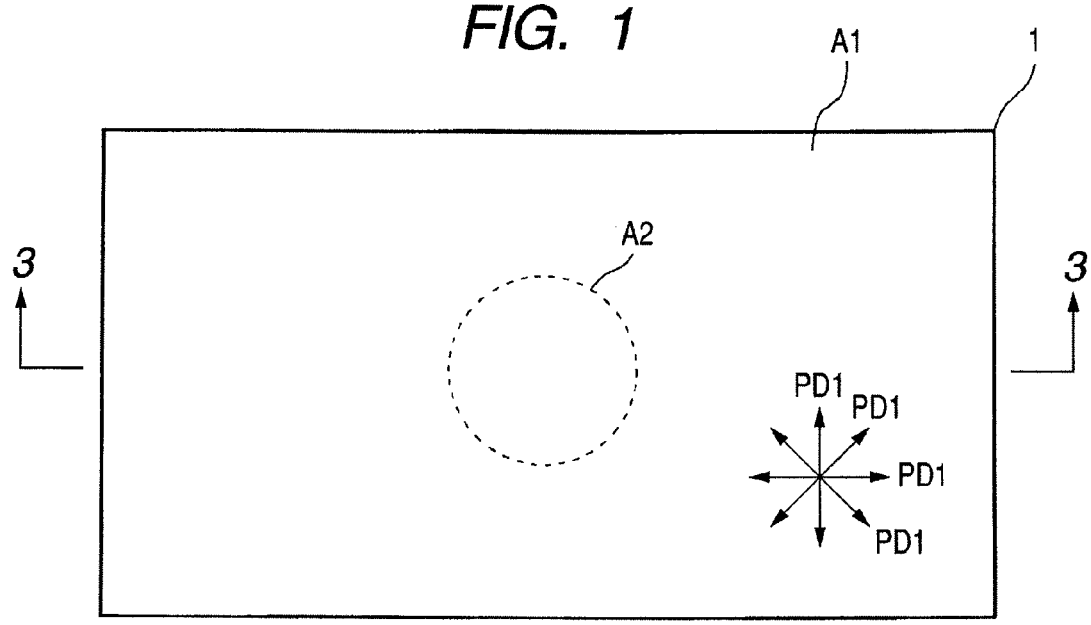
FIG. 1 is a plan view of a magnetic sheet according to an embodiment of the disclosure.

A magnetic sheet, an apparatus for manufacturing a magnetic sheet, and a method of manufacturing a magnetic sheet according to embodiments of the invention will be described below with reference to drawings.

Slurry, which contains flat soft magnetic metal powder and a binding material, is shaped into a sheet by a doctor-blade method or a coating method that injects flat soft magnetic metal powder to a binding material, and is cured in the shape of a sheet by heating and pressurizing after the application of a magnetic field. Accordingly, a magnetic sheet according to the embodiment is obtained.

It is preferable that amorphous metal having an amorphous phase as the main phase or a metal glass alloy showing glass transition, particularly, a Fe-based metal glass alloy be used as the soft magnetic metal. For example, $Fe_{100-x-y-z-w-t}M_xP_y\text{-}C_zB_wSi_t$ (M: one or more elements selected from a group consisting of Cr, Mo, W, V, Nb, Ta, Ti, Zr, Hf, Pt, Pd, and Au) may be used as the compositions of the Fe-based metal glass alloy. x, y, z, w, and t, which represent composition ratios, satisfy 0.5 atomic %≦x≦8 atomic %, 2 atomic %≦y≦15 atomic %, 0 atomic %<z≦8 atomic %, 1 atomic %≦w≦12 atomic %, 0 atomic %≦t≦8 atomic %, and 70 atomic %≦(100-x-y-z-w-t)≦79 atomic %. Further, alternatively, a Fe—Al—Ga—C—P—Si—B alloy which has been used in the past or a metal glass alloy containing the composition except for a Fe group may be used.

When a metal glass alloy is used as the soft magnetic metal, flat powder of a metal glass alloy is firstly obtained by pulverizing an alloy ribbon that is obtained by quenching a metal glass alloy melt having the desired composition with a liquid quenching method, or by mechanically pulverizing spherical particles that are obtained with a water atomizing method or a gas atomizing method by an attritor or the like. It is preferable that heat treatment be performed on the obtained metal glass alloy in order to reduce internal stress if necessary. It is preferable that the heat treatment temperature Ta be in the range from the Curie point Tc to the glass transition temperature Tg.

It is preferable that the aspect ratio (long diameter/thickness) of the flat soft magnetic metal powder be equal to or higher than 2.5, and it is more preferable that the aspect ratio of the flat soft magnetic metal powder be equal to or higher than 12. If the aspect ratio of the flat soft magnetic metal powder is equal to or higher than 2.5, the imaginary magnetic permeability μ" of the magnetic sheet is equal to or higher than 10. Further, if the aspect ratio thereof is equal to or higher than 12, the imaginary magnetic permeability μ" of the magnetic sheet is equal to or higher than 15. Meanwhile, if the aspect ratio of the flat soft magnetic metal powder is high, the flat soft magnetic metal powder is oriented at the time of the compression molding of the magnetic sheet so that an imaginary magnetic permeability μ" corresponding to the GHz band is increased. Accordingly, the electric wave absorption characteristics of the magnetic sheet is improved, but the upper limit of the aspect ratio is about 250 in consideration of the technical level of a current manufacturing technique.

Furthermore, it is preferable that the Fe-based metal glass alloy satisfy an expression of "ΔTx=Tx−Tg>25K" (ΔTx: temperature interval of supercooled liquid, Tx: crystallization start temperature, and Tg: glass transition temperature). The Fe-based metal glass alloy, which satisfies the above-mentioned expression, has excellent soft magnetic characteristics. Accordingly, the imaginary magnetic permeability μ" of the magnetic sheet is equal to or higher than 10 or is equal to or higher than 15 in some cases, the magnetic sheet has an improved electromagnetic wave suppression effect in the GHz band, and the magnetic sheet effectively suppresses high-frequency noise.

It is preferable that a heat resistant resin such as a silicone resin or a thermoplastic resin such as polyvinyl chloride be used as the binding material. In this case, a lubricant, which is formed of stearate or a dispersion medium such as xylene, toluene, or isopropyl alcohol, may be added to the magnetic sheet in addition to the flat soft magnetic metal powder or the binding material.

It is preferable that the content of the flat soft magnetic metal powder of the magnetic sheet be in the range of 41 to 83 volume % when a metal glass alloy is used as the flat soft magnetic metal powder. If the content of the flat soft magnetic metal powder is equal to or higher than 41 volume %, the imaginary magnetic permeability μ" of the magnetic sheet becomes 10 or more. Accordingly, a noise suppression effect is effectively exerted. Further, if the content of the flat soft magnetic metal powder is equal to or lower than 83 volume %, adjacent particles of the flat soft magnetic metal powder do not come in contact with each other. Accordingly, the deterioration of the impedance of the magnetic sheet is effectively prevented.

It is preferable that the thickness t of the magnetic sheet be in the range of 25 to 440 μm before the heating and pressurizing of the magnetic sheet. If the thickness t of the magnetic sheet is in the range of 25 to 440 μm before heating and pressurizing, the imaginary magnetic permeability μ" of the magnetic sheet is equal to or higher than 10. Meanwhile, if the thickness t of the magnetic sheet is in the range of 55 to 400 μm before heating and pressurizing, the imaginary magnetic permeability μ" is equal to or higher than 15.

Figure 2:
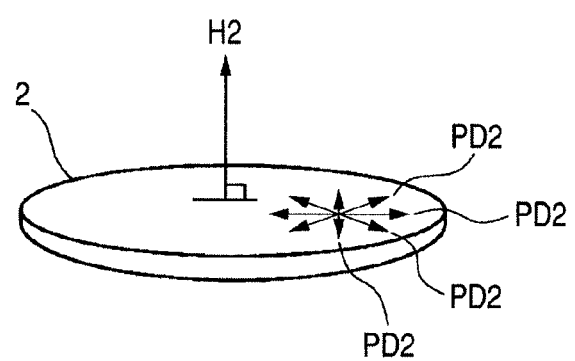
FIG. 2 is a perspective view showing flat soft magnetic metal powder of the embodiment.
Figure 3:
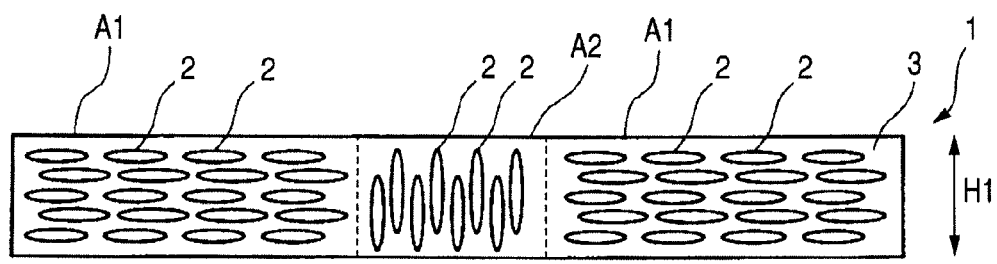
FIG. 3 is a cross-sectional view taken along a line 3-3 of FIG. 1.

FIG. 1 is a plan view of the magnetic sheet 1, FIG. 2 is a front view showing a normal direction H2 and in-plane directions PD2 of the flat soft magnetic metal powder 2, and FIG. 3 is a cross-sectional view taken along a line 3-3 of FIG. 1. In this case, as for the orientation of the flat soft magnetic metal powder 2, the flat soft magnetic metal powder 2 mixed to a partial area A2 of the magnetic sheet 1 is different from the flat soft magnetic metal powder 2 mixed to the other area (entire area) A1 thereof as shown in FIG. 1. If the normal direction H2 of the flat soft magnetic metal powder 2 is defined as shown in FIG. 2, the in-plane directions PD2 of the flat soft magnetic metal powder 2 are parallel to the thickness direction H1 of the magnetic sheet 1 and the normal direction H2 of the flat soft magnetic metal powder 2 is orthogonal to the thickness direction H1 of the magnetic sheet 1 at the partial area A2 of the magnetic sheet 1 as shown in FIG. 3. In contrast, the in-plane directions PD2 of the flat soft magnetic metal powder 2 are parallel to the in-plane directions PD1 of the magnetic sheet 1 and the normal direction H2 of the flat soft magnetic metal powder 2 is parallel to the thickness direction H1 of the magnetic sheet 1 at the entire area A1 of the magnetic sheet 1 except for the partial area A2.

An apparatus 11 for manufacturing the magnetic sheet 1 according to this embodiment will be described below with reference to FIGS. 4 and 5.

The apparatus 11 for manufacturing the magnetic sheet 1 according to this embodiment includes a long film 13, a film transfer device 12, a slurry sheet forming device 14, a first air core coil 15, and a second coil 16.

The long film 13 is formed by elongating a PET film. Slurry 4 is placed on the surface of the long film 13 supplied from a dispenser 17.

The film transfer device 12 is means for transferring the long film 13, and various mechanisms may be considered as the film transfer device. In the film transfer device 12 of this embodiment, a plurality of large and small different transport rollers 12a is disposed on a film transfer path.

The slurry sheet forming device 14 shapes the slurry 4, which is placed on the surface of the long film 13, into a sheet. As described above, various methods may be considered as methods of forming a slurry sheet 5 from the slurry 4. However, in this embodiment, a sheet is formed by mainly using a doctor blade 18 and a rolling roller 19. The doctor blade 18 adjusts the thickness of the slurry 4 applied on the long film 13 so that the thickness of the slurry becomes uniform. The length of the doctor blade is set to be longer than the width of the slurry sheet 5 (in a direction of the in-plane directions of the long film 13 orthogonal to a transfer direction FD). Further, the rolling roller 19 is disposed downstream of the doctor blade 18 so as to roll the sheet in a desired thickness, for example, in the range of 25 to 440 μm as described above.

A circular or elliptical coil, of which a diameter or a long diameter is larger than the width of the long film 13 (in a direction orthogonal to the longitudinal direction (long direction) of the long film 13), is selected as the first air core coil 15. As shown in FIGS. 4 and 5, the first air core coil 15 is disposed so that the long film 13 passes through the inside of the first air core coil 15 while the transfer direction FD of the long film 13 corresponds to the axial direction of the first air core coil. Further, the current-flow direction of the first air core coil 15 is a direction where the direction of a magnetic field generated by the first air core coil 15 is the same as or parallel to the transfer direction FD of the long film 13.

In contrast, a circular or elliptical coil, of which the diameter or long diameter is equal to the size of a partial area A2 of the slurry sheet 5 having a different orientation of the flat soft magnetic metal powder 2 from other areas, is selected as the second coil 16. As shown in FIGS. 4 and 5, the second coil 16 may be any one of an air core coil and an iron core coil. Further, double coils 16a and 16b, which are obtained by forming two coils 16a and 16b in the shape of one coiled metal wire so that the long film 13 passes through the inside of the second coil 16 as shown in FIGS. 4 and 5, are selected as the second coil 16 of this embodiment. The double coils 16a and 16b are disposed in series on the same axis, and the winding directions of the coils are the same as each other.

The second coil 16 is disposed downstream of the first air core coil 15 in the transfer direction FD of the long film 13, and is disposed so that the thickness direction h of the long film 13 is parallel to the axial direction of the second coil and the long film 13 passes through the inside of the second coil 16 (the connection area of the double coil-shaped second coil 16). A distance between the first air core coil 15 and the second coil 16 is set so that the magnetic field of one coil does not have an adverse effect on the magnetic field of the other coil. The current-flow direction of the second coil 16 is a direction where the direction of a magnetic field generated by the second coil 16 is the same as or parallel to the thickness direction h of the long film 13.

Meanwhile, although not particularly shown in the drawings, a cutting device or a slurry sheet curing device is provided in the apparatus 11 for manufacturing the magnetic sheet 1 according to this embodiment. The slurry sheet curing device thermally cures the slurry sheet 5 and the cutting device cuts the slurry sheet 5 into a desired size after the slurry sheet 5 passes through the second coil 16.

A method of manufacturing the magnetic sheet 1 according to this embodiment will be described below by using the apparatus 11 for manufacturing the magnetic sheet 1 according to this embodiment. The method of manufacturing the magnetic sheet 1 according to this embodiment includes a slurry sheet forming step, an entire magnetic field applying step, a local magnetic field applying step, and a slurry curing step.

In the slurry sheet forming step that is a first step, the slurry 4 is firstly formed by mixing the flat soft magnetic metal powder 2 in the binding material 3 (see FIG. 3). After that, the slurry 4 is shaped into a sheet so that the slurry sheet 5 is formed. If the apparatus 11 for manufacturing the magnetic sheet 1 according to this embodiment is used, the slurry 4 is applied on the long film 13 from the dispenser 17 filled with the slurry 4 and the applied slurry 4 is formed into a slurry sheet 5 having a uniform thickness by the doctor blade 18 and the rolling roller 19 as shown in FIG. 4.

In the entire magnetic field applying step that is a second step, a magnetic field is applied to the entire area A1 of the expanded slurry sheet 5 in a predetermined direction. When a magnetic field is applied to the flat soft magnetic metal powder 2 in a predetermined direction, the in-plane directions PD2 of the flat soft magnetic metal powder 2 are parallel to the application direction of the magnetic field. Accordingly, the orientation of the entire flat soft magnetic metal powder 2 mixed in the slurry sheet 5 is unified in a predetermined direction. If the apparatus 11 for manufacturing the magnetic sheet 1 according to this embodiment is used, the first air core coil 15 applies a magnetic field to the entire area A1 of the slurry sheet 5 in a predetermined direction as shown in FIGS. 4 and 5. The first air core coil 15 is disposed so that the slurry sheet 5 passes through the inside of the first air core coil 15 while the axial direction of the first air core coil is parallel to the in-plane directions PD1 of the slurry sheet 5. Accordingly, since the application direction of the magnetic field generated by the first air core coil 15 is parallel to the in-plane directions PD1 of the expanded slurry sheet 5, the orientation of the flat soft magnetic metal powder 2 is unified in a direction where the in-plane directions PD2 of the flat soft magnetic metal powder 2 are parallel to the in-plane directions PD1 of the slurry sheet 5.

Meanwhile, if it is expected that the in-plane directions PD2 of the flat soft magnetic metal powder 2 over the entire area A1 of the slurry sheet 5 become parallel to the in-plane directions PD1 of the slurry sheet 5 by rolling in the slurry sheet forming step that is a previous step, the entire magnetic field applying step may be omitted from the method of manufacturing the magnetic sheet 1 according to this embodiment and the method of manufacturing the magnetic sheet 1 according to this embodiment may include the slurry sheet forming step, the local magnetic field applying step, and the slurry curing step.

In the local magnetic field applying step that is a third step, a magnetic field is locally applied to the partial area A2 of the expanded slurry sheet 5 in a predetermined direction after the entire magnetic field applying step. When a magnetic field is applied to the flat soft magnetic metal powder 2 in a predetermined direction as described above, the in-plane directions PD2 of the flat soft magnetic metal powder 2 are parallel to the application direction of the magnetic field. Accordingly, only the orientation of the flat soft magnetic metal powder 2, which exists in the partial area A2 to which a magnetic field is locally applied, of the entire flat soft magnetic metal powder 2 mixed in the slurry sheet 5 is unified in a predetermined direction. If the apparatus 11 for manufacturing the magnetic sheet 1 according to this embodiment is used, the second coil 16 locally applies a magnetic field to the partial area A2 of the slurry sheet 5 in a predetermined direction as shown in FIGS. 4 and 5. The second coil 16 is disposed downstream of the first air core coil 15 in the transfer direction FD of the long film 13, and is disposed so that the thickness direction h of the long film 13 is parallel to the axial direction of the second coil and the long film 13 passes through the inside of the second coil 16 (the connection area of the double coil-shaped second coil 16). Accordingly, a magnetic field is locally applied to the partial area A2 of the slurry sheet 5 from the second coil 16 in a direction parallel to the thickness direction H1 of the slurry sheet 5. Further, the orientation of the flat soft magnetic metal powder 2 is unified in a direction where the in-plane directions PD2 of the flat soft magnetic metal powder 2 are parallel to the thickness direction H1 of the slurry sheet 5. When the entire magnetic field applying step and the local magnetic field applying step are completed, the orientation of the flat soft magnetic metal powder 2 existing in the slurry sheet 5 corresponds to the orientation shown in FIG. 3.

In the slurry curing step that is a fourth step, the slurry sheet 5 is heated and pressurized after the local magnetic field applying step and is cured. The cured slurry sheet 5 is the magnetic sheet 1 according to this embodiment.

The operation of the magnetic sheet 1 according to this embodiment, the apparatus 11 for manufacturing the magnetic sheet 1 according to this embodiment, and the method of manufacturing the magnetic sheet 1 according to this embodiment will be described below with reference to drawings.

First, the operation of the magnetic sheet 1 according to this embodiment will be described below. If the normal direction H2 of the flat soft magnetic metal powder 2 existing in the magnetic sheet 1 is parallel to the thickness direction H1 of the magnetic sheet 1, the magnetic sheet 1 exerts high noise suppressing characteristics. In contrast, if the normal direction H2 of the flat soft magnetic metal powder 2 is orthogonal to the thickness direction H1 of the magnetic sheet 1, the magnetic sheet 1 exerts high dielectric characteristics. For this reason, in the magnetic sheet 1 according to this embodiment, as shown in FIG. 3, the normal direction H2 of the flat soft magnetic metal powder 2 existing in the magnetic sheet 1 is orthogonal to the thickness direction H1 of the magnetic sheet 1 at the partial area A2 of the magnetic sheet 1 and the thickness direction H1 of the magnetic sheet 1 is parallel to the normal direction H2 of the flat soft magnetic metal powder 2 at the entire area A1 of the magnetic sheet 1 except for the partial area A2. Accordingly, it may be possible to exert high dielectric characteristics at the partial area A2 while exerting high noise suppressing characteristics at the entire area A1 of the magnetic sheet 1. Further, the orientation of the flat soft magnetic metal powder 2 is changed only at the partial area A2 of the magnetic sheet 1. However, as long as the partial area A2 is not very large, noise, in terms of noise characteristics, does not enter from the partial area A2. Therefore, it may be possible to locally impart high dielectric characteristics to the magnetic sheet without the deterioration of the noise suppressing characteristics.

The operation of the apparatus 11 for manufacturing the magnetic sheet 1 according to this embodiment will be described below. In the apparatus 11 for manufacturing the magnetic sheet 1 according to this embodiment, as shown in FIGS. 4 and 5, the first air core coil 15 is provided on the upstream side in the transfer direction FD of the slurry sheet 5, and the second coil 16 is provided downstream of the first air core coil. If the slurry sheet 5 passes through the inside of the first air core coil 15 in the axial direction of the first air core coil during the current flow of the first air core coil 15, a magnetic field is applied to the entire area A1 of the slurry sheet 5 in a direction parallel to the transfer direction FD of the slurry sheet 5. Accordingly, the in-plane directions PD2 of the flat soft magnetic metal powder 2 become parallel to the in-plane directions PD1 of the slurry sheet 5. Further, if the slurry sheet 5 passes through the second coil 16 during the current flow of the second coil 16 after the slurry sheet 5 passes through the inside of the first air core coil 15, a magnetic field is applied to the slurry sheet in a direction parallel to the thickness direction H1 of the slurry sheet 5. Accordingly, the in-plane directions PD2 of the flat soft magnetic metal powder 2 become parallel to the thickness direction H1 of the slurry sheet 5. For this reason, the orientation of the flat soft magnetic metal powder 2 at the partial area A2 of the magnetic sheet 1 is orthogonal to that at the other area (entire area) A1 thereof. Therefore, it may be possible to manufacture the magnetic sheet 1 to which high dielectric characteristics opposite to excellent noise suppressing characteristics are locally imparted.

In this case, since the slurry sheet 5 passes through the inside of the first air core coil 15 in the axial direction of the first air core coil, the flat soft magnetic metal powder 2 existing in the slurry sheet 5 is apt to be affected by the magnetic field generated from the first air core coil 15. Accordingly, the orientation of the flat soft magnetic metal powder 2 at the entire area A1 of the slurry sheet 5 is apt to be unified. In contrast, since the slurry sheet 5 passes through the second coil 16 in a direction orthogonal to the axial direction of the second coil, the flat soft magnetic metal powder 2 is hardly affected by the magnetic field generated from the second coil 16. Accordingly, it may not be possible to improve the orientation of the flat soft magnetic metal powder 2 at the partial area A2 of the slurry sheet 5.

Figure 4:
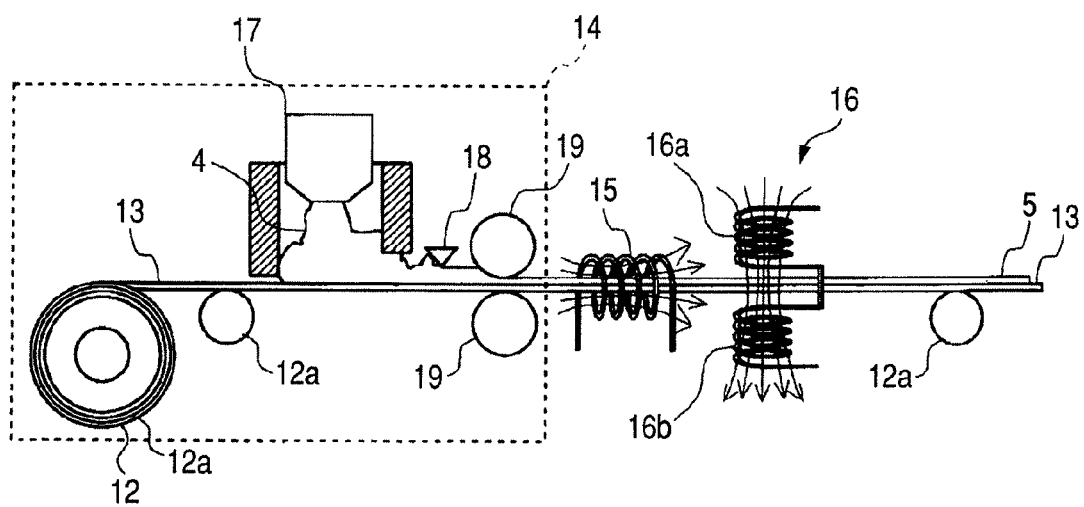
FIG. 4 is a side view of an apparatus for manufacturing the magnetic sheet according to the embodiment.
Figure 5:
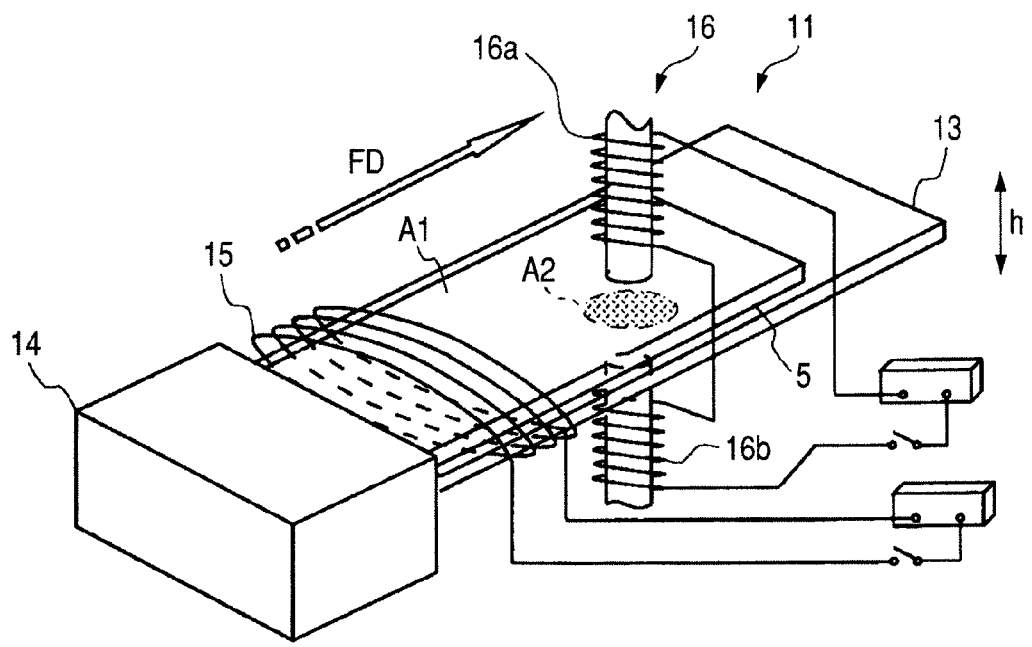
FIG. 5 is a perspective view of the apparatus for manufacturing the magnetic sheet according to the embodiment.

As shown in FIGS. 4 and 5, the second coil 16 is formed of double coils 16a and 16b using one metal wire and the slurry sheet 5 passes through the connection area, that is, the inside of the second coil 16. Since the slurry sheet 5 passes through the inside (connection area) of the second coil 16 where very linear magnetic lines of force are generated as shown in FIG. 4, it may be possible to improve the orientation of the flat soft magnetic metal powder 2 at the partial area A2 of the slurry sheet 5.

The operation of the method of manufacturing the magnetic sheet 1 according to this embodiment will be described below.

In the method of manufacturing the magnetic sheet 1 according to this embodiment, the local magnetic field applying step is provided between the slurry sheet forming step and the slurry curing step. In the local magnetic field applying step, a magnetic field is locally applied to the partial area A2 of the expanded slurry sheet 5. In general, the orientation of the flat soft magnetic metal powder 2 existing in the slurry sheet 5 is unified by applying a magnetic field to the entire area A1 of the slurry sheet 5 or rolling the entire area, but it may be possible to make only the orientation of the flat soft magnetic metal powder 2, existing in the partial area A2 of the slurry sheet 5, be unified in a predetermined direction by adding the above-mentioned local magnetic field applying step. Accordingly, it may be possible to manufacture the magnetic sheet 1 of which the magnetic characteristics are locally changed, on the basis of the orientation.

In the method of manufacturing the magnetic sheet 1 according to this embodiment, the entire magnetic field applying step is provided after the slurry sheet forming step and before the local magnetic field applying step. When a magnetic field is applied to the entire area A1 of the expanded slurry sheet 5 in a predetermined direction, the orientation of the entire flat soft magnetic metal powder 2 mixed in the slurry sheet 5 is unified in a predetermined direction. If the local magnetic field applying step is performed subsequently, the flat soft magnetic metal powder 2, of which the orientation is different from the orientation of the flat soft magnetic metal powder 2 existing in the entire area A1 of the slurry sheet 5, exists in the partial area A2 of the slurry sheet 5. Accordingly, it may be possible to manufacture the magnetic sheet 1 that has bidirectionality in the magnetic characteristics of the magnetic sheet 1 at the partial area A2 of the magnetic sheet 1 and the other area (entire area) A1 thereof.

Further, in this embodiment, the application direction of the magnetic field in the entire magnetic field applying step is parallel to the in-plane directions PD1 of the slurry sheet 5, and the application direction of the magnetic field in the local magnetic field applying step is parallel to the thickness direction H1 of the slurry sheet 5. Accordingly, the in-plane directions PD2 of the flat soft magnetic metal powder 2 existing in the entire area A1 of the slurry sheet 5 are parallel to the in-plane directions PD1 of the slurry sheet 5 in the entire magnetic field applying step, and only the in-plane directions PD2 of the flat soft magnetic metal powder 2 existing in the partial area A2 of the slurry sheet 5 are parallel to the thickness direction H1 of the slurry sheet 5 in the local magnetic field applying step. Accordingly, it may be possible to manufacture the magnetic sheet 1 with excellent noise suppressing characteristics at the entire area A1 of the magnetic sheet 1 and excellent high dielectric characteristics only at the partial area A2 thereof.

Further, as shown in FIGS. 4 and 5, in the entire magnetic field applying step of this embodiment, the slurry sheet 5 passes through the inside of the first air core coil 15 in the axial direction of the first air core coil so that a magnetic field is applied to the entire area A1 of the slurry sheet 5 in a direction parallel to the in-plane directions PD1 of the slurry sheet 5. Since the slurry sheet 5 passes through the position where the magnetic lines of force are most linear and magnetic flux density is high in the magnetic field generated from the first air core coil 15, it may be possible to easily change the orientation of the entire flat soft magnetic metal powder 2. Furthermore, in the local magnetic field applying step, the slurry sheet 5 passes through the vicinity of the end of the second coil 16 or the inside of the second coil so that a magnetic field is applied to the slurry sheet in a direction parallel to the thickness direction H1 of the slurry sheet 5. Since the slurry sheet 5 passes through the position where the magnetic lines of force are relatively or most linear and magnetic flux density is high in the magnetic field generated from the second coil 16, it may be possible to easily and locally change the in-plane directions PD2 of the flat soft magnetic metal powder 2 into the thickness direction H1 of the slurry sheet 5.

Figure 6:
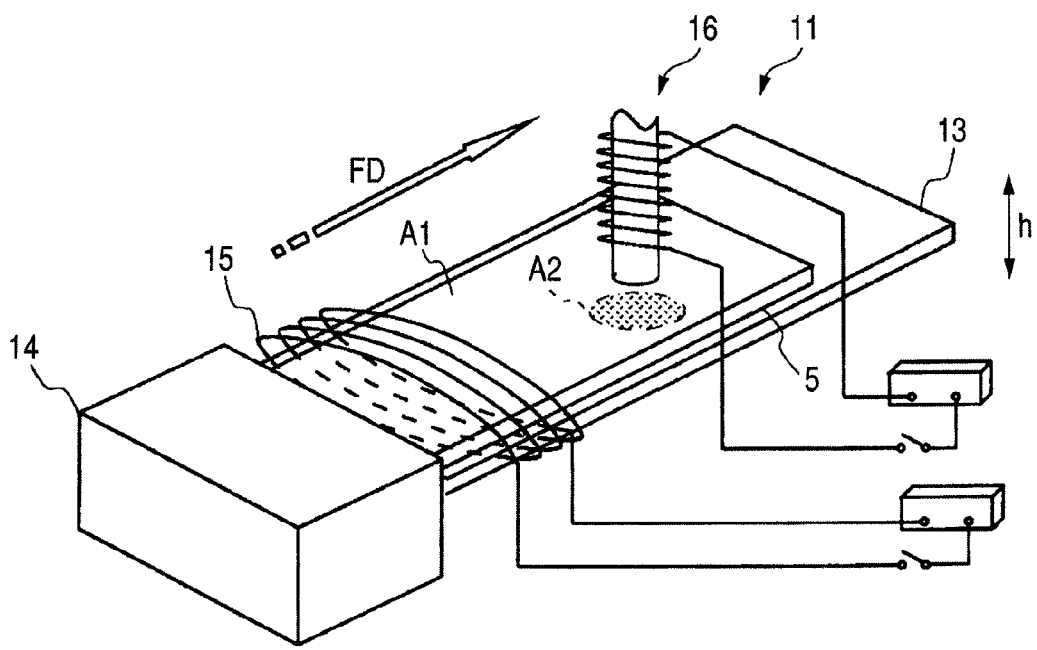
FIG. 6 is a perspective view of an apparatus for manufacturing a magnetic sheet according to another embodiment of the invention.

Due to a spatial problem, if the second coil 16 has the shape of a normal coil, it is difficult to make the slurry sheet 5 pass through the inside of the second coil 16 even though it is easy to make the slurry sheet 5 pass through the vicinity of the end of the second coil 16 as shown in FIG. 6. Meanwhile, as shown in FIG. 5, the second coil 16 of this embodiment has the shape of double coils that are formed of one metal wire coiled in the same winding direction. Further, in the local magnetic field applying step, the slurry sheet 5 passes through the connection area, that is, the inside of the second coil 16. According to this method, since the slurry sheet 5 passes through the position where the magnetic lines of force are most linear and magnetic flux density is high in the magnetic field generated from the second coil 16, it may be possible to improve the orientation of the flat soft magnetic metal powder 2 at the partial area A2 of the slurry sheet 5.

Further, flat powder of metal glass or amorphous metal is employed as the flat soft magnetic metal powder 2 in order to most effectively bring out the magnetic characteristics of the magnetic sheet 1. Accordingly, it may be possible to manufacture the magnetic sheet 1 that has both excellent noise suppressing characteristics and local high dielectric characteristics.

That is, according to the magnetic sheet, the apparatus for manufacturing the magnetic sheet, and the method of manufacturing the magnetic sheet of this embodiment, the magnetic characteristics of the magnetic sheet is locally changed by partially changing the orientation of the flat soft magnetic metal powder mixed in the magnetic sheet. Accordingly, it may be possible to obtain an advantage of achieving two opposite characteristics on one magnetic sheet without the combination of a plurality of magnetic sheets.

Meanwhile, the invention is not limited to the above-mentioned embodiments, and may have various modifications when necessary.

It should be understood by those skilled in the art that various modifications, combinations, sub-combinations and alterations may occur depending on design requirements and other factors insofar as they are within the scope of the appended claims of the equivalents thereof.

What is claimed is:

1. A method of manufacturing a magnetic sheet, the method comprising:
   a slurry sheet forming step of forming slurry by mixing flat soft magnetic metal powder in a binding material, and forming a slurry sheet by shaping the slurry into a sheet;
   a local magnetic field applying step of unifying only the orientation of the flat soft magnetic metal powder, which exists in the partial area, of the entire flat soft magnetic metal powder mixed in the slurry sheet in a predetermined direction by locally applying a magnetic field to a partial area of the expanded slurry sheet in a predetermined direction; and
   a slurry curing step of forming a magnetic sheet by curing the slurry sheet after the local magnetic field applying step;
   an entire magnetic field applying step of unifying only the orientation of the entire flat soft magnetic metal powder, which is mixed in the slurry sheet, in a predetermined direction by applying a magnetic field to the entire area of the expanded slurry sheet in a predetermined direction after the slurry sheet forming step and before the local magnetic field applying step.

2. The method according to claim 1,
   wherein the application direction of the magnetic field in the entire magnetic field applying step is parallel to an in-plane direction of the expanded slurry sheet, and
   the application direction of the magnetic field in the local magnetic field applying step is parallel to the thickness direction of the expanded slurry sheet.

3. The method according to claim 2,
   wherein a magnetic field is applied to the entire area of the slurry sheet in a direction parallel to the in-plane direction of the slurry sheet in the entire magnetic field applying step by making the slurry sheet pass through the inside of a first air core coil so that the axial direction of the current-supplied first air core coil is parallel to the in-plane direction of the slurry sheet, and
   a magnetic field is applied to the slurry sheet in a direction parallel to the thickness direction of the slurry sheet in the local magnetic field applying step by making the slurry sheet pass through the vicinity of an end of a second coil or the inside of the second coil so that the axial direction of a current-supplied second coil is parallel to the thickness direction of the slurry sheet and the axial direction of the second coil is orthogonal to the in-plane direction of the slurry sheet.

4. The method according to claim 3,
   wherein the second coil comprises double coils that are disposed in series by coiling two portions, which are positioned on the same axis, of one metal wire in the same direction, and
   the slurry sheet passes through a connection area, that is, the inside of the second coil in the local magnetic field applying step.

5. The method according to claim 1,
   wherein the flat soft magnetic metal powder is flat powder of one of metal glass or amorphous metal.

* * * * *